United States Patent
Salle et al.

(10) Patent No.: US 9,836,282 B2
(45) Date of Patent: Dec. 5, 2017

(54) SEPARATION OF CONCERNS BETWEEN INFORMATION TECHNOLOGY SERVICES MODELS

(75) Inventors: Mathias Salle, San Francisco, CA (US); Erik Eidt, Campbell, CA (US)

(73) Assignee: EntIT Software LLC, Sunnyvale, CA (US)

( * ) Notice: Subject to any disclaimer, the term of this patent is extended or adjusted under 35 U.S.C. 154(b) by 2439 days.

(21) Appl. No.: 12/261,989

(22) Filed: Oct. 30, 2008

(65) Prior Publication Data

US 2010/0037201 A1 Feb. 11, 2010

Related U.S. Application Data

(60) Provisional application No. 61/087,536, filed on Aug. 8, 2008.

(51) Int. Cl.
*G06F 9/44* (2006.01)

(52) U.S. Cl.
CPC .................. *G06F 8/10* (2013.01); *G06F 8/20* (2013.01); *G06F 8/24* (2013.01)

(58) Field of Classification Search
CPC ................. G06F 8/10; G06F 8/20; G06F 8/24
USPC ......................................................... 717/104
See application file for complete search history.

(56) References Cited

U.S. PATENT DOCUMENTS

| 7,240,325 | B2 * | 7/2007 | Keller ........................... 717/104 |
| 2004/0205691 | A1 * | 10/2004 | Poole et al. ................... 717/100 |
| 2005/0149907 | A1 * | 7/2005 | Seitz et al. .................... 717/108 |
| 2008/0082959 | A1 * | 4/2008 | Fowler .......................... 717/104 |
| 2008/0259930 | A1 * | 10/2008 | Johnston et al. ........... 370/395.2 |

\* cited by examiner

*Primary Examiner* — Li B Zhen
*Assistant Examiner* — Bradford Wheaton

(57) ABSTRACT

Methods, systems, and computer program products are provided for exchanging information between information technology (IT) services. An architecture provides separation of concern between the models by separating the models for IT services into an operation model and a structural model that are linked by a service model. The service model can be configurable to extend the operation model. Configuration of the operation model includes defining messages exchanged between the IT services. Configuration of the structural model includes capturing a structure of the IT services. The service model has an association with the structural model, the association making the structural model opaque to the operation model.

18 Claims, 6 Drawing Sheets

| | |
|---|---|
| ACTIVATION SERVICE | THE ACTIVATION SERVICE IS A GENERIC ACTUATOR WHICH RESPONSIBILITY IS TO DISPATCH SERVICE ACTIVATION REQUESTS TO THE APPROPRIATE CUSTOM ACTIVATOR. |
| APPROVAL SERVICE | THE APPROVAL SERVICE (COMPUTATIONAL SERVICE) IS RESPONSIBLE FOR APPROVING OR NOT A RECEIVED ORDER. |
| AUTHENTICATION SERVICE | THE AUTHENTICATION SERVICE (DATA AND COMPUTATIONAL SERVICE) IS RESPONSIBLE FOR THE MANAGEMENT OF USERS, ROLES AND ACCESS RIGHT AS WELL AS FOR GRANTING AUTHORIZATIONS. |
| BILLING SERVICE | THE BILLING SERVICE (COMPUTATIONAL SERVICE) IS RESPONSIBLE FOR SETTING UP CHARGE BACK MECHANISM AND PROPER BILLING FOR RECEIVED ORDERS. |
| CATALOG SERVICE | THE CATALOG SERVICE (COMPUTATIONAL SERVICE) IS RESPONSIBLE FOR THE GENERATION OF A SERVICE OFFERINGS. |
| CONFIGURATION MANAGEMENT SERVICE | THE CONFIGURATION MANAGEMENT SERVICE (DATA SERVICE) IS RESPONSIBLE CARRYING OUT THE BINDING PHASE OF THE INSTANTIATION PROCESS AND FOR THE MANAGEMENT OF THE LIFECYCLE OF INSTANCES. |
| CREATION CONFIGURATION SERVICE | THE CREATION CONFIGURATION SERVICE (DATA SERVICE) IS RESPONSIBLE FOR CARRYING OUT THE GROUNDING PHASE OF THE INSTANTIATION PROCESS. |
| DESIGN SERVICE | THE DESIGN SERVICE (DATA SERVICE) IS RESPONSIBLE FOR THE MANAGEMENT OF THE LIFECYCLE OF MODELS. |

*FIG. 2A*

| | |
|---|---|
| DISCOVERY SERVICE | THE DISCOVERY SERVICE (COMPUTATIONAL SERVICE) IS A GENERIC ACTUATOR RESPONSIBLE FOR TRIGGERING THE DISCOVERY OF ASSETS IN THE INFRASTRUCTURE. TO FULFILL ITS RESPONSIBILITY, ITS CONNECTS TO CUSTOM DISCOVERY SERVICES. |
| INCIDENT SERVICE | THE INCIDENT SERVICE (DATA SERVICE) IS RESPONSIBLE FOR THE MANAGEMENT OF THE LIFECYCLE OF INCIDENTS. |
| INSTALLER SERVICE | THE INSTALLER SERVICE IS A GENERIC ACTUATOR WHICH RESPONSIBILITY IS TO DISPATCH SERVICE INSTALLATION REQUESTS TO THE APPROPRIATE CUSTOM ACTIVATOR. |
| LOGGING SERVICE | THE LOGGING SERVICE (DATA SERVICE) IS RESPONSIBLE FOR THE LIFECYCLE MANAGEMENT OF LOG MESSAGES. |
| MONITORING SERVICE | THE MONITORING SERVICE IS A GENERIC ACTUATOR WHICH RESPONSIBILITY IS TO DISPATCH SERVICE MONITORING REQUESTS TO THE APPROPRIATE CUSTOM ACTIVATOR. |
| OFFERING AVAILABILITY ESTIMATION SERVICE | THE OFFERING AVAILABILITY ESTIMATION SERVICE (COMPUTATIONAL SERVICE) IS RESPONSIBLE FOR THE GENERATION OF SERVICE OFFERING AVAILABILITY AND PRICING. |
| ORDER PROCESSING SERVICE | THE ORDER PROCESSING SERVICE (DATA SERVICE) IS RESPONSIBLE FOR THE MANAGEMENT OF THE LIFECYCLE OF ORDERS. |

FIG. 2B

| | |
|---|---|
| PACKAGE MODEL DESIGN SERVICE | THE PACKAGE MODEL DESIGN SERVICE (DATA SERVICE) IS RESPONSIBLE FOR THE LIFECYCLE MANAGEMENT OF PACKAGE MODEL. |
| POLICY SERVICE | THE POLICY SERVICE (DATA AND COMPUTATIONAL SERVICE) IS A GENERIC SERVICE AND HAS THE RESPONSIBILITY OF DISPATCHING POLICY EVALUATION REQUESTS TO THE APPROPRIATE SPECIFIC POLICY SERVICES. |
| REQUEST RESOLUTION SERVICE | THE REQUEST RESOLUTION SERVICE (COMPUTATIONAL SERVICE) IS RESPONSIBLE FOR THE INITIATING THE INSTANTIATION PROCESS OF MODELS. |
| RFC EXECUTION SERVICE | THE REQUEST FOR CHANGE (RFC) EXECUTION SERVICE (DATA SERVICE) IS RESPONSIBLE FOR THE MANAGEMENT OF THE LIFECYCLE OF RFCS IN THE PLATFORM. |
| RFC SCHEDULING SERVICE | THE REQUEST FOR CHANGE (RFC) SCHEDULING SERVICE (COMPUTATIONAL SERVICE) IS RESPONSIBLE FOR THE FINDING OPTIMAL SCHEDULES FOR RFC IN THE PLATFORM. |
| SESSION SERVICE | THE SESSION SERVICE (DATA SERVICE) IS RESPONSIBLE FOR THE MANAGEMENT OF THE LIFECYCLE OF SESSIONS. THE CREATE METHOD GENERATE A NEW SESSION IN THE OPEN STATE ASSOCIATED WITH A NEW, UNIQUE SESSIONKEY, CHANGES TO THE SESSION STATE, SUCH AS CLOSING THE SESSION IS DONE THROUGH THE UPDATE METHOD. |
| VALIDATION SERVICE | THE VALIDATION SERVICE (COMPUTATIONAL SERVICE) IS RESPONSIBLE FOR THE VALIDATION OF THE WELL FORMNESS OF AN ORDER. |

FIG. 2C

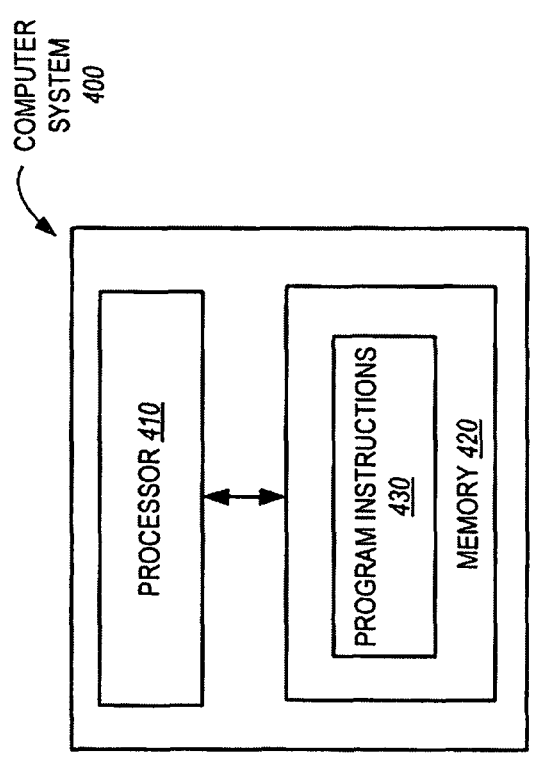

SEPARATION OF CONCERNS BETWEEN INFORMATION TECHNOLOGY SERVICES MODELS

CROSS-REFERENCE TO RELATED APPLICATION

This Utility Patent Application is based on and claims the benefit of U.S. Provisional Application No. 61/087,536, filed on Aug. 8, 2008, the contents of which are hereby incorporated by reference in their entirety.

BACKGROUND

Over the last few years, information technology (IT) organizations have increasingly adopted standards and best practices to ensure efficient IT service delivery. In this context, the IT Infrastructure Library (ITIL) has been rapidly adopted as the de facto standard. ITIL defines a set of standard processes for the management of IT service delivery organized in processes for Service Delivery (Service Level Management, Capacity Management, Availability Management, IT Continuity Management and Financial Management) and Service Support (Release Management, Configuration Management, Incident Management, Problem Management and Change Management). The Service Support processes, such as Configuration Management, Incident Management, and Configuration Management are some of the more common processes IT organizations have implemented to bring their service to an acceptable level for their businesses.

Service-Oriented Architecture (SOA) is an emerging concept that describes an architectural style or approach centered on the development of business processes packaged as services. SOA defines the IT infrastructure to allow different applications to exchange data and participate in the business processes. These functions are loosely coupled with the operating systems and programming languages underlying the applications.

SUMMARY

Methods, systems, and computer program products are provided for exchanging information between information technology (IT) services. An architecture provides separation of concern between the models by separating the models for IT services into an operation model and a structural model that are linked by a service model. The service model is configurable to extend the operation model. Configuration of the operation model includes defining messages exchanged between the IT services. Configuration of the structural model includes capturing a structure of the IT services. The service model has an association with the structural model, the association making the structural model opaque to the operation model.

BRIEF DESCRIPTION OF THE DRAWINGS

Embodiments of the invention relating to both structure and method of operation may best be understood by referring to the following description and accompanying drawings:

FIG. 2 illustrates in a tabular form an exemplary list of service operations supported by an architecture described with reference to FIG. 1, according to an embodiment;

FIG. 4 illustrates a block diagram of a computer system, according to an embodiment.

DETAILED DESCRIPTION

Figure 1:
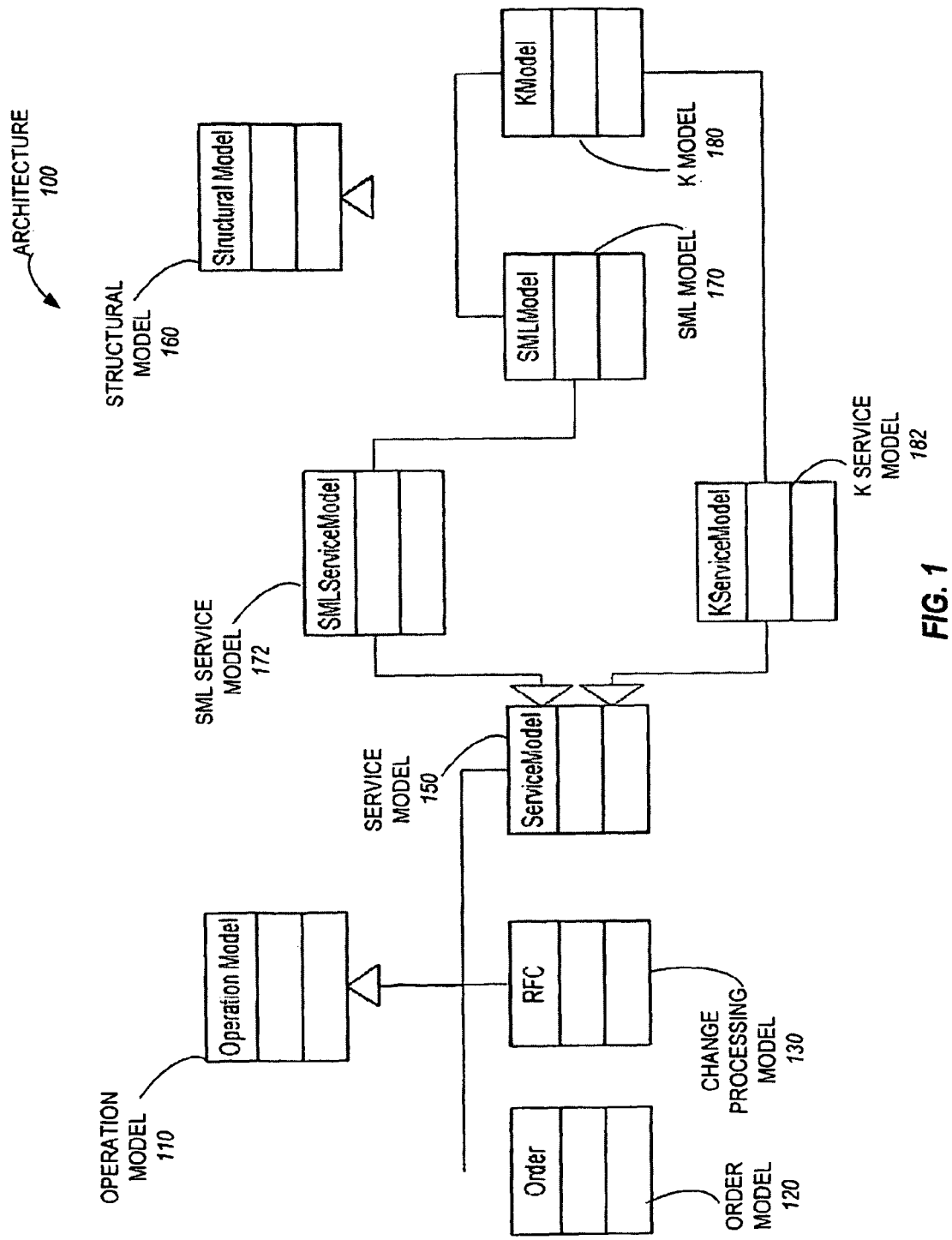
FIG. 1 illustrates an exemplary architecture for an exchange of information between IT services, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various modules, devices or components described herein may be implemented as hardware (including discrete components, integrated circuits and systems-on-a-chip 'SoC'), firmware (including application specific integrated circuits and programmable chips) and/or software or a combination thereof, depending on the application requirements. The accompanying drawings may not to be drawn to scale and some features of embodiments shown and described herein may be simplified or exaggerated for illustrating the principles, features, and advantages of the disclosure.

The following terminology may be useful in understanding the present disclosure. It is to be understood that the terminology described herein is for the purpose of description and should not be regarded as limiting.

Architecture—A blueprint or basic infrastructure designed to provide one or more functions. An architecture used in an IT environment may typically include hardware, software and services building blocks that are designed to work with each other to deliver core functions and extensible functions. The core functions are typically a portion of the architecture, e.g., an operating system, which may not be modifiable by the user. The extensible functions are typically a portion of the architecture that has been explicitly designed to be customized and extended by the user as a part of the implementation process. For example, services oriented architecture (SOA) is a type of an architecture used for addressing the management's need for structuring IT services that lowers cost and enhances reusability.

Model—A model can be a representation of the characteristics and behavior of a system, element, solution, or service. A model as described herein captures the design of a particular IT system, element, solution, or service. The model can be a declarative specification of the structural, functional, non-functional, and runtime characteristics of the IT system, element, solution, or service. The instantiation of a model creates a model instance. Unlike object oriented (OO) theory, in which an instance object can be merely a slot space, the model instance can be a design space that is capable of accommodating refinement.

IT artifact—An IT artifact refers to a tangible attribute or property of an IT system. Examples of an IT artifact may include hardware, software, documentation, source code, test apparatus, project plans, educational and marketing material, and similar others. The IT artifact may be available or external or internal use.

Separation of concerns—A technique for addressing different issues of a problem individually, thereby making it possible to concentrate on each issue separately. Applying this principle may result in a decrease in the complexity by dividing the problem into different smaller issues; support division of efforts and separation of responsibilities; and improve the modularity of IT systems or artifacts.

Service—Utility or benefit provided by a provider to a consumer. The provider and the consumer may vary by application and may include an enterprise, a business unit, a business process, an application, a third party, an individual, and similar others. Enterprise services may be provided in the course of conducting the enterprise business. IT services generally refers to any application that enables the enterprise to provide utility or benefit by adding functionality to the IT infrastructure.

Service Model—A service model can be the representation of a service within a SOA. It defines the externally visible description, behavior, state, and operations available from a service to other services. As described herein, instantiation of a service model can be conducted in two phases—a binding phase and a grounding phase. The binding phase can be responsible for resolving dependencies between models. The grounding phase can be responsible for materializing the instances, e.g., by creating an IT artifact corresponding to the specification defined in the service model instance.

Meta Model—A meta model (or metamodel) can be a description of a set of building blocks, constructs and rules that define the model itself.

System—One or more interdependent elements, components, modules, or devices that co-operate to perform one or more predefined functions.

Configuration—Describes a set up of elements, components, modules, devices, and/or a system, and refers to a process for setting, defining, or selecting hardware and/or software properties, parameters, or attributes associated with the elements, components, modules, devices, and/or the system.

Users can capture IT services structure by defining one or more service models within the SOA that define the externally visible description, behavior, state, and operations available from a service to other services. Architecture of currently available service models can be complex and typically includes numerous service operations. The complex service models capture the service description in workflow or scripting that invokes the service operations. However, the user-defined service descriptions that are typically captured in workflows or scripts are often difficult to translate into other forms and are difficult to debug (except in the context of actual execution). Separation of concerns between the service models may be a challenge in a SOA environment. In addition, designing an architecture for IT services that can be independent of a modeling language may also be a challenge in the SOA environment.

Applicants recognize that it would be desirable to provide an architecture for exchange of information between IT services that would include tools and techniques to separate concerns between operational message modeling and structural data modeling. That is, it would be desired to provide an architecture that separates the models exchanged between the services in the SOA and the models that represent the item the SOA can be responsible for instantiating and managing. Applicants further recognize that it would be desirable for the architectures' services, and their operations, to be defined independently of the service modeling language (SML), thereby enabling a replacement of the SML and supporting coexistence of multiple structural modeling languages.

Architecture for Exchange of Information Between IT Services

Systems and methods disclosed herein provide an architecture for an exchange of information (or communication) between IT services that uses simple interfaces and is language independent. The architecture is structured to provide separation of concern between the models by separating the models into an operation model (also referred to as a W model) and a structural model (also referred to as a K model) that are linked by a service model. The service model can be configurable to extend the operation model. Configuration of the operation model includes defining messages exchanged between the IT services. Configuration of the structural model includes capturing a structure of the IT services. The service model has an association with the structural model, the association making the structural model to be opaque to the operation model.

FIG. 1 illustrates an exemplary architecture 100 for an exchange of information between IT services, according to an embodiment. The architecture 100 includes a plurality of models that co-operatively interact with one another and with external applications or users to provide services in a SOA environment. The architecture 100 supports models for the IT services that may be expressed in multiple languages. The communication between IT services can be performed in an agnostic manner that is independent of the language used in the service model. The architecture 100, which focuses on the instantiation and management of modeled items, separates the models exchanged between the services in the SOA and the models that represent the item the SOA can be responsible for instantiating and managing. Although the depicted embodiment illustrates the architecture 100 being implemented as a class model showing static class objects and associations there between, it is understood that the architecture 100 may be implemented using, among others, procedure-based techniques, component-based techniques, object-oriented techniques, and rule-based techniques.

In the depicted embodiment, the architecture 100 separates the modeling of IT services into multiple tiers, thereby providing separation of concerns between the service models. An operation model 110 (referred to as the W model or an operational message model) can be provided as a first tier and a structural model 160 (referred to as the K model or a structural data model) can be provided as a second tier. A third tier (not shown) provides language independence for the architecture 100. The operation model 110 and the structural model 160 are linked by a service model 150 (shown as ServiceModel module). The operational model 110 describes the actions performed by services and the structural model 160 can be acted upon in the action. The architecture 100 enables the user to structure the IT services models so that the operation model 110 can be configurable independently of the structural model 160, including a service modeling language (SML) that may be used to specify the structural model 160.

The operation model 110 can be operable to define messages exchanged between the IT services. For example, in a particular embodiment, the messages may be exchanged in the form of XML documents. A plurality of service operations are performed by exchanging the messages between the models. The architecture 100 does not concern itself about the content of the messages exchanged between the models. The services are operable to interpret the content in a native or non-native manner. For example, an architecture for e-mail services is concerned about transport of the e-mail (with or without attachment) from a sender to a receiver but is not concerned about the content, including interpretation of the attachment.

An exemplary list of service operations supported by the architecture 100 is described with reference to FIGS. 2A, 2B, and 2C. In the depicted embodiment, the operation model 110 can be configurable to perform a plurality of service operations including order processing through an order model 120, change processing through a RFC (request for change) model 130, incident handling through an event model 140, and services model processing through the service model 150. The service model 150 thus extends the operation model 110.

The plurality of service operations capable of being performed by the operation model 110 support a simple application programming interface (API) including performing simple operations such as create, read, update, and delete (CRUD). The same CRUD style interface can be provides across all services.

The structural model 160 can be operable to capture a structure of the IT services to be created. Examples of a structural model may include a common information model (CIM) service representation, the service modeling language (SML) model, and a K model. The structural model 160 can be extended to define a SML model 170 (shown as SMLModel module) and a K model 180 (shown as KModel module). Object classes SML service model 172 and K service model 182 are respectively created from the SML model 170 and a K model 180. The link between the operation model 110 and the structural model 160 can be established through the SML service model 172 and K service model 182, which extend the service model 150. Specifically, the service model 150 provides an association with the SML service model 172 (shown as SMLServiceModel module) and K service model 182 (shown as KServiceModel module), in a manner which makes the structural model 160 opaque to the operation model 110. That is, the association of the service model 150 with the structural model 160 enables substitution in a class. The capability to make a substitution makes the structural model 160 opaque to the operation model 110.

The structural model 160 can be defined by a meta model, thereby enabling the structural model 160 to be translated into other modeling languages. Thus, the architecture 100 enables easy translation of user-defined models to other forms (both model-oriented and script-oriented forms) thereby enhancing its flexibility. In addition, the architecture 100 provides the tools and techniques for the replacement of the SML with other modeling languages and for the coexistence of multiple structural modeling languages. As described herein, a meta model is a model that further explains or describes a set of related models. Specifically, the meta model includes an explicit description (of constructs and rules) of how a domain-specific model is built.

The operation model 110 may be specified by using various modeling languages including, among others, a unified modeling language (UML), the Resource Description Framework (RDF), Extensible Markup Language (XML) Schema, XML Metadata Interchange (XMI), and Java languages or a combination thereof. The RDF may include extensions such as RDF Schema and languages such as the RDF Ontology Web Language (RDF/OWL).

As described earlier, some services that operate on the operation model 110 subclasses, for instance an Ordering Service manages Orders and treats any reference to the detailed service model structures, e.g., the structural model 160 as opaque. On the other hand, services for which logic is dependent on the structural model 160 or subclasses thereof, an aggregation pattern can be used. That is, services whose interface is based on the structural model 160 are dynamically dispatched to services with interfaces specified on the subclasses of the structural model 160, such as custom actuator services (not shown).

Exemplary List of Services Supported by the Architecture

FIGS. 2A, 2B, and 2C illustrate in a tabular form an exemplary list of service operations supported by the architecture 100 described with reference to FIG. 1, according to an embodiment. The list of services may be described to perform a generic service, a data service, a computational service or combination thereof. An activation service 202 can be a generic actuator with responsibility to dispatch service activation requests to an appropriate custom activator. An approval service 204 (computational service) can be responsible for approving or not approving a received order. An authentication service 206 (data and computational service) can be responsible for the management of users, roles and access rights as well as granting authorizations. A billing service 208 (computational service) can be responsible for setting up charge back mechanism and proper billing for received orders.

A catalog service 212 (computational service) can be responsible for the generation of a service offerings. A configuration management service 214 (data service) can be responsible carrying out a binding phase of the instantiation process and for the management of the lifecycle of instances. A creation configuration service 216 (data service) can be responsible for carrying out a grounding phase of the instantiation process. A design service 218 (data service) can be responsible for the management of the lifecycle of models.

A discovery service 222 (computational service) can be a generic actuator responsible for triggering the discovery of assets in the infrastructure. To fulfill its responsibility, discovery service 222 can connect to custom discovery services. An incident service 224 (data service) can be responsible for the management of the lifecycle of incidents or events. An installer service 226 can be a generic actuator responsible to dispatch service installation requests to the appropriate custom activator. A logging service 228 (data service) can be responsible for the lifecycle management of log messages.

A monitoring service 232 can be a generic actuator which has the responsibility to dispatch service monitoring requests to the appropriate custom activator. An offering availability estimation service 234 (computational service) can be responsible for the generation of service offering availability and pricing. An order processing service 236 (data service) can be responsible for the management of the lifecycle of orders. A package model design service 238 (data service) can be responsible for the lifecycle management of package model.

A policy service 242 (data and computational service) can be a generic service and has the responsibility of dispatching policy evaluation requests to the appropriate specific policy services. A request resolution service 244 (computational service) can be responsible for the initiation of the instantiation process of models. A request for change (RFC) execution service 246 (data service) can be responsible for the management of the lifecycle of RFCs in the platform. A RFC scheduling service 248 (computational service) can be responsible for the finding optimal schedules for RFC in the platform.

A session service 252 (data service) can be responsible for the management of the lifecycle of sessions. The create method generate a new session in the open state associated with a new, unique SessionKey. Changes to the session state, such as closing the session can be done through the update method. A validation service 254 (computational service) can be responsible for the validation of an order.

Figure 3:
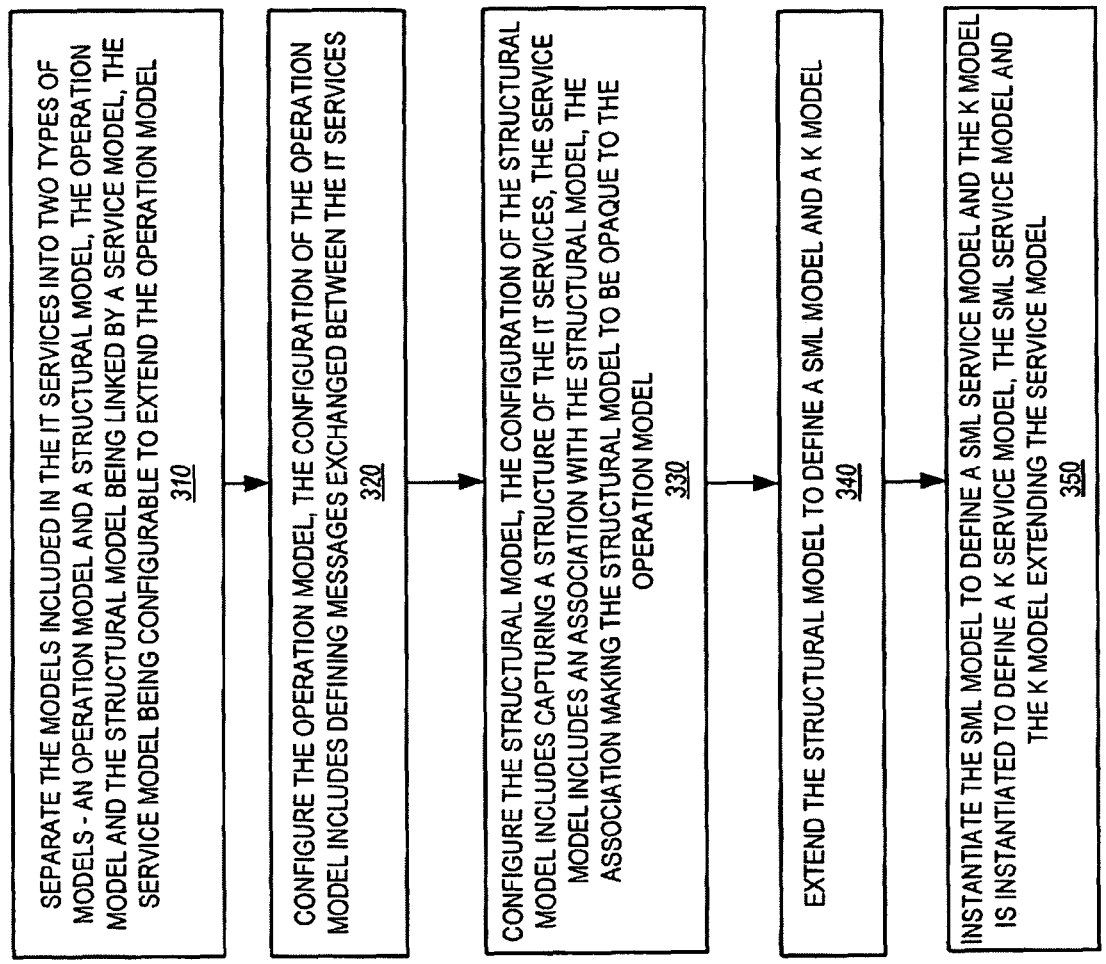
FIG. 3 is a flow chart of a method for exchange of information between IT services, according to an embodiment.

FIG. 3 is a flow chart of a method for exchange of information between IT services, according to an embodiment. In a particular embodiment, the method can be used for exchange of information between IT services described with reference to FIGS. 1, 2A, 2B and 2C.

At process 310, the models included in the IT services are separated into two types of models—an operation model and a structural model. The operation model and the structural model are separate but linked by a service model. The service model can be configurable to extend the operation model. At process 320, the operation model can be configured. The configuring of the operation model includes defining messages exchanged between the IT services. At process 330, the structural model can be configured. The configuring of the structural model includes capturing a structure of the IT services. The service model includes an association with the structural model, the association making the structural model to be opaque to the operation model.

It is understood, that various steps described above may be added, omitted, combined, altered, or performed in different orders. For example, steps may be added to extend the structural model. At process 340, the structural model can be extended to define a SML model and a K model. At process 350, the SML model can be instantiated to define a SML service model and the K model can be instantiated to define a K service model, the SML service model and the K model extending the service model.

Benefits of the tools and techniques for exchange of information between IT services include an architecture that provides services and operations that are independent of the modeling language used. The architecture provides for the replacement of the structural modeling language, and, also for the coexistence of multiple structural modeling languages. It further allows the service operations to concentrate on simple transaction-oriented operations, e.g., by using CRUD, while introducing complexity into the structural models. The architecture provides support for the development of simple models as well as complex models to match the application needs.

Computer System

FIG. 4 illustrates a block diagram of a computer system 400, according to an embodiment. The computer system 400 includes a processor 410 coupled to a memory 420. The memory 420 can be operable to store program instructions 430 that are executable by the processor 410 to perform one or more functions. It should be understood that the term "computer system" can be intended to encompass any device having a processor that can be capable of executing program instructions from a memory medium. In a particular embodiment, the various functions, processes, methods, and operations described herein may be implemented using the computer system 400. For example, the architecture 100 or any components thereof, may be implemented using the computer system 400.

The various functions, processes, methods, and operations performed or executed by the system 400 can be implemented as the program instructions 430 (also referred to as software or simply programs) that are executable by the processor 410 and various types of computer processors, controllers, central processing units, microprocessors, digital signal processors, state machines, programmable logic arrays, and the like. In an exemplary, non-depicted embodiment, the computer system 400 may be networked (using wired or wireless networks) with other computer systems.

In various embodiments the program instructions 430 may be implemented in various ways, including procedure-based techniques, component-based techniques, object-oriented techniques, rule-based techniques, among others. The program instructions 430 can be stored on the memory 420 or any computer-readable medium for use by or in connection with any computer-related system or method. A computer-readable medium can be an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of data models are described. The illustrative architecture for exchange of information between IT services can be used with any suitable data models. The illustrative techniques may be used with any suitable data processing configuration and with any suitable servers, computers, and devices. In the claims, unless otherwise indicated the article "a" is to refer to "one or more than one".

What is claimed is:

1. A method for exchanging information between information technology (IT) services, the method comprising:
    separating models for the IT services into an operation model and a structural model, the operation model and the structural model being linked by a service model, the service model being configurable to extend the operation model;
    configuring the operation model, the configuring of the operation model includes defining messages exchanged between the IT services; and
    configuring the structural model, the configuring of the structural model includes capturing a structure of the IT services, the service model includes an association with the structural model, the association of the service model with the structural model enabling substitution in a class, the substitution making the structural model opaque to the operation model.

2. The method according to claim 1 further comprising:
the structure being captured as a meta model, the meta model capable of being translated into a plurality of modeling languages.

3. The method according to claim 1 further comprising:
exchanging the messages to perform a plurality of service operations including ordering, change processing, and incident handling.

4. The method according to claim 3 further comprising:
the plurality of service operations being configurable to perform a create, read, update, and delete operation.

5. The method according to claim 1 further comprising:
the operation model being configured using one of UML, XML Schema, XMI, RDF, and Java languages or a combination thereof.

6. The method according to claim 1 further comprising:
extending the structural model to define a SML model and a K model;
instantiating the SML model to define a SML service model and instantiating the K model to define a K service model, the SML service model and the K model extending the service model.

7. A computer system for exchanging information between information technology (IT) services, the computer system comprising:
a computer processor; and
logic instructions on tangible computer readable media and executable by the computer processor to cause the computer processor to:
separate models for the IT services into an operation model and a structural model, the operation model and the structural model being linked by a service model, the service model being configurable to extend the operation model;
configure the operation model, the configuration of the operation model includes defining messages exchanged between the IT services;
configure the structural model, the configuration of the structural model includes capturing a structure of the IT services, the service model includes an association with the structural model; and
enable a substitution in a class by the association of the service model with the structural model, the substitution making the structural model opaque to the operation model.

8. The computer system according to claim 7 further comprising:
logic instructions to cause the computer processor to capture the structure as a meta model, the meta model capable of being translated into a plurality of modeling languages.

9. The computer system according to claim 7 further comprising:
logic instructions to cause the computer processor to exchange the messages to perform a plurality of service operations including ordering, change processing, and incident handling.

10. The computer system according to claim 9 further comprising:
logic instructions to cause the computer processor to configure the plurality of service operations to perform a create, read, update, and delete operation.

11. The computer system according to claim 7 further comprising:
logic instructions to cause the computer processor to configure the operation model using one of UML, XML Schema, XMI, RDF, and Java languages or a combination thereof.

12. The computer system according to claim 7 further comprising logic instructions to cause the computer processor to:
extend the structural model to define a SML model and a K model;
instantiate the SML model to define a SML service model and instantiating the K model to define a K service model, the SML service model and the K model extending the service model.

13. A computer program product for exchanging information between information technology (IT) services comprising:
logic instructions on a non-transitory computer readable storage executable to cause a computer processor to:
separate models for the IT services into an operation model and a structural model, the operation model and the structural model being linked by a service model, the service model being configurable to extend the operation model;
configure the operation model, the configuration of the operation model includes defining messages exchanged between the IT services; and
configure the structural model, the configuration of the structural model includes capturing a structure of the IT services, the service model includes an association with the structural model; and
enable a substitution in a class by the association of the service model with the structural model, the substitution making the structural model opaque to the operation model.

14. The computer program product of claim 13 further comprising:
logic instructions on the non-transitory computer readable storage executable to cause the computer processor to capture the structure as a meta model, the meta model capable of being translated into a plurality of modeling languages.

15. The computer program product of claim 13 further comprising:
logic instructions on the non-transitory computer readable storage executable to cause the computer processor to exchange the messages to perform a plurality of service operations including ordering, change processing, and incident handling.

16. The computer program product of claim 15 further comprising:
logic instructions on the non-transitory computer readable storage executable to cause the computer processor to configure the plurality of service operations to perform a create, read, update, and delete operation.

17. The computer program product of claim 13 further comprising:
logic instructions on the non-transitory computer readable storage executable to cause the computer processor to configure the operation model using one of UML, XML Schema, XMI, RDF, and Java languages or a combination thereof.

18. The computer program product of claim 13 further comprising logic instructions on the non-transitory computer readable storage executable to cause the computer processor to:

extend the structural model to define a SML model and a K model;

instantiate the SML model to define a SML service model and instantiating the K model to define a K service model, the SML service model and the K model extending the service model.

\* \* \* \* \*